United States Patent [19]
Adamski

[11] 3,987,471
[45] Oct. 19, 1976

[54] SHUTTER FOR PHOTOGRAPHIC CAMERAS

[75] Inventor: Gunter Adamski, Braunschweig, Germany

[73] Assignee: Rollei-Werke Franke & Heidecke, Braunschweig, Germany

[22] Filed: Nov. 10, 1975

[21] Appl. No.: 630,513

[30] Foreign Application Priority Data
Dec. 18, 1974 Germany............................ 2459849

[52] U.S. Cl................................ 354/226; 354/154; 354/242
[51] Int. Cl.².......................................... G03B 9/32
[58] Field of Search .......... 354/154, 242, 226, 247, 354/250, 241

[56] References Cited
UNITED STATES PATENTS

| | | | |
|---|---|---|---|
| 266,035 | 10/1882 | Higgins | 354/250 X |
| 1,434,164 | 10/1922 | Stephenson | 354/250 |
| 2,992,602 | 7/1961 | Heden | 354/154 |

FOREIGN PATENTS OR APPLICATIONS

| | | | |
|---|---|---|---|
| 198,908 | 9/1967 | U.S.S.R. | 354/250 |

*Primary Examiner*—L. T. Hix
*Assistant Examiner*—E. M. O'Connor
*Attorney, Agent, or Firm*—Ralf H. Siegemund

[57] ABSTRACT

The shutter in front of the image aperture is constructed from two pairs of flaps which fold and unfold and are actuated by levers so that flap edges move as leading and trailing edges of a slit across the aperture. The flaps fold temporarily into the space occupied, for example, by a fold-up mirror prior to exposure if the camera is of the single reflex type.

6 Claims, 3 Drawing Figures

1

SHUTTER FOR PHOTOGRAPHIC CAMERAS

BACKGROUND OF THE INVENTION

The present invention relates to a shutter for photographic cameras, particularly but not exclusively for single lens reflex cameras.

Photographic cameras have shutters which are usually divided into two classes. One class of shutters is of the leaf type wherein the shutter mechanism is disposed inside of the lens system. The shutters of the other class are usually called focal plane shutters, and they are constructed to have one or two curtains which are wound onto and unwound from spools to move near the focal plane, parallel to the film and adjacent to the image aperture, gate or window, in the back of the camera. Strictly speaking, the invention does not relate to shutters of either type and deviates particularly from the concept of shutter curtains; however, the inventive shutter has the general feature of a focal plane shutter, namely, providing for opening and closing of the image window or aperture for exposing the film behind that window or aperture.

DESCRIPTION OF THE INVENTION

It is an object of the present invention to provide a new and improved shutter for photographic cameras which is as effective as a focal plane shutter without, however, requiring the particular extra mounting space as is usually required by the known type of focal plane shutters for accommodating the movable curtains.

It is a specific object of the present invention to provide a new and improved shutter for photographic cameras which utilizes the space which is not used otherwise during periods other than the periods of exposure. This is to hold true not just for the shutter proper but also even for a part of the drive mechanism.

In accordance with the preferred embodiment of the present invention, it is suggested to provide two pairs of hinged flaps with one flap of each pair being hinged along the image aperture, gate or window of the camera, adjacent the film so that the pairs of flaps are hinged along opposite edges of that aperture. Each pair has one flap with a free edge and means are provided to run these edges individually along the aperture and parallel thereto. These last mentioned means are preferably a pair of controlled levers, each being pivoted with one end to a stationary point inside of the camera, and the respective opposite ends of these levers are pivotally linked to the flaps of the pairs having the free edges respectively. These levers are turned independently so that a slit can be established between the free edges across the aperture which slit is made to move across the aperture for exposure. However, the edges can be moved while in engagement with each other so that exposure is not provided during such movement. On the other hand, the edges may be moved sequentially for time exposure.

The control levers are mounted to the side of the image gate or aperture and one does not really need any special space for them. If they are pivoted by or on shafts, they can be very simply connected to the shutter drive mechanism.

The shutter in accordance with the preferred embodiment of the invention has, furthermore, the characteristics that only the edges of the flaps forming the slit have to move for the full distance across the aperture and with the full speed; other portions of the shutter, particularly the remainder of the flaps having the free edges as well as the respective other flaps, move slower and for shorter distances. The paths to be traversed by the edges do not have to exceed the height or the width of the image aperture which, in turn, means that the speed obtainable under otherwise similar conditions can be higher, and the periods of exposure obtainable in that manner can be shorter accordingly. As will be seen later in this specification, if the camera is of the single reflex type having a mirror which is to be pivoted up just prior to exposure, synchronization of shutter and mirror movement is very simple indeed.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
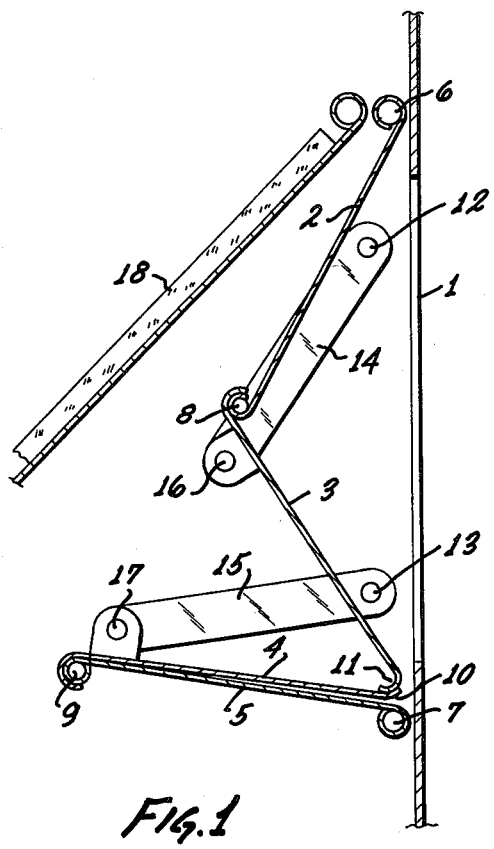
FIG. 1 is a side view of the shutter in accordance with the preferred embodiment of the invention when cocked.

Proceeding now to the detailed description of the drawings, reference numeral 1 denotes the frame for the image aperture, gate or window, and the film (not shown) is disposed to the right thereof. The lens or lens system of the camera, likewise not shown, is disposed to the left of the illustration of FIGS. 1 and 2. Reference 18 denotes the mirror which in FIG. 1 has disposition to direct the light from the lens into the viewfinder portion of a single lens reflex camera. Mirror 18 is shown in folded up position in FIGS. 2 and 3.

The shutter has as its basic element two pairs of flaps, the first pair being constituted by flaps 2 and 3 and the second pair being constituted by flaps 4 and 5. The first pair of flaps is hinged along the upper window or aperture edge by means of a hinge 6; the second pair is hinged along the lower window edge by means of a hinge 7. The flaps of each pair are lighttight and lightproof hinged to each other; hinge 8 interconnecting flaps 2 and 3, and hinge 9 interconnecting flaps 4 and 5, whereby these hinges 8 and 9 of the two pairs are disposed in about the middle of each flap pair taken as a whole.

The free ends of each flap pair, respectively one edge of flap 3 and one edge of flap 4, are bent or flanged so that flap 4 has a fold or cradle-like edge 10 which receives fold 11 which is a complementarily contoured flange of flap 3. The engagement of folds or edges 10 and 11 must be lighttight along the extension of the flap pair ends, but they do not snap together.

The two pairs of flaps are mounted so that lighttight engagement of edges 10 and 11 can be maintained even when the pair 2, 3 is, for example, folded up while pair 4, 5 is unfolded or vice versa.

Flap 3 carries a pin 16 disposed rather closely to hinge 8, and a control lever 14 is pivoted, i.e. pivotally linked to that pin 16. Lever 14 has its other end mounted for pivoting; for example, it may be pivotally mounted on a stationary pin, or the pin 12 may be secured to that other end of lever 14, and pin 12 itself is journalled in stationary bearings in the housing of the camera. Analogously, one end of control lever 15 is pivoted to pin 17 which is mounted on flap 4, rather closely to hinge 9, while the other end of lever 15 is mounted for pivoting. For example, this other end of lever 15 may carry a stationary pin 13 which conceivably serves as a shaft, or is an extension of a shaft 21.

As levers 14 and 15 pivot about their respective stationary pivot points as established by the axes of pins 12 and 13 respectively, flaps 3 and 4 are, in fact, moved so that the edges 11 and 10 respectively move linearly and parallelly to the plane of aperture 1. Specifically, one obtains here a linear motion as the result of composite and superimposed pivot motion. For example, the pivot motion of the flap 4 about the axis of hinge 9 as produced by pivot motion of the pivot point 17 about pin 13 in conjunction with pivoting of hinge axis 9 itself about hinge 7 produces a coordinated movement so that the edge 10 does not undergo a movement along a circular path but moves linearly along the window 1. The same is true with regard to edge 11 whose movement is also the result of three pivot motions, namely, the pivot motion of flap 2 about stationary hinge axis 6, the pivot motion of flap 3 about the axis of hinge 8, and the turning motion of pivot point 16 about stationary pivot axis of hinge 12.

Figure 3:
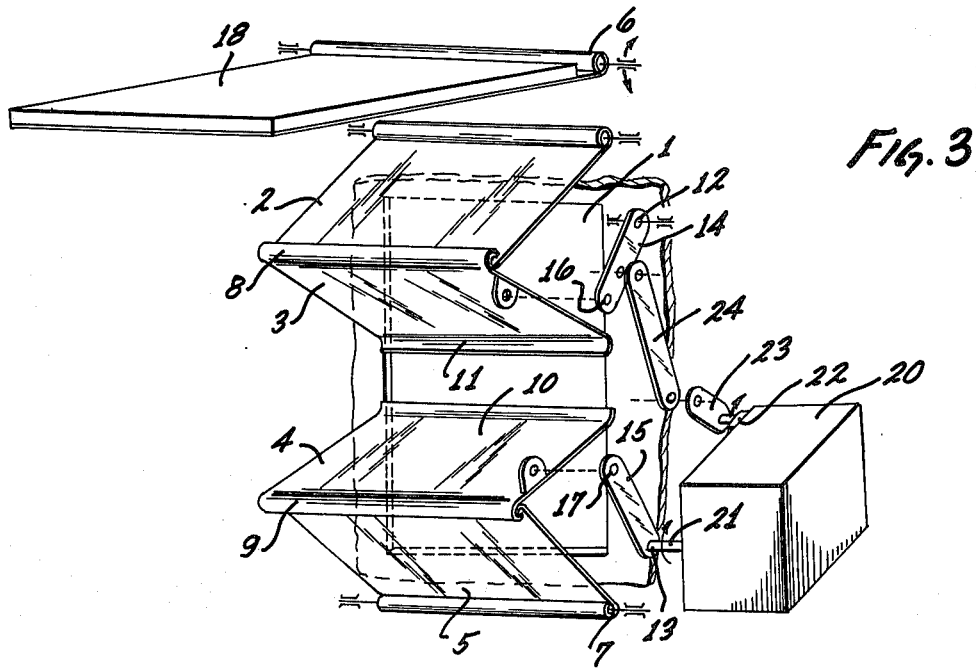
FIG. 3 is a perspective view of the same shutter during release and exposure, whereby the drive and actuating linkage is shown in exploded view.

As indicated somewhat schematically in FIG. 3, reference numeral 20 denotes the shutter drive mechanism which can be of any kind, mechanically or electrically, and the drive has two output shafts 21 and 22 with rotate synchronism, whereby shaft 21 is extended so that its end constitutes pivot pin 13. Shaft 22 pivots an arm 23 which, in turn, is pivotally linked to an arm 24 and the latter in turn is pivotally linked to control lever 14. These elements are proportioned so that the respective flap edges 10 and 11 are being moved with the same speed.

If shafts 21, 22 move in unison, these edges 10 and 11 remain engaged. This will be the case, for example, if the drive mechanism 20 is constructed for returning the shutter elements to a normal position when cocked. For exposure, however, shaft 22 begins to turn before shaft 21. This inherent timing or sequencing of shaft movements results from the operation of the shutter mechanism 20 which is conventional and does not need further elaboration. The delay in the onset of movement of shafts 21 and 22 determines the width of the gap between edges 10 and 11 which gap opens up to establish the exposure slit, as soon as shaft 22 begins to turn while shaft 21 is not yet turning. The width of the slit thus established as well as the speed of both shafts subsequently determines the exposure time. Again, this portion of the device is conventional and as far as time/motion is concerned is similar to the movement of a slit established between two curtains in a conventional focal plane type shutter with movable curtains.

As stated, FIG. 1 shows the shutter flaps in a position in which the shutter mechanism is cocked or otherwise ready for release. The mirror 18 is folded down to open the light path between the lens and the viewfinder eye piece. As the shutter mechanism is released or triggered, mirror 18 is folded up at first in the usual fashion. Thereafter shaft 22 begins to turn to pivot control level 14 in clockwise direction (FIG. 1), thereby beginning to fold flap pair 2 and 3. Accordingly, edge 11 disengages from edges 10 and opens a gap which constitutes the slit for exposure.

Shortly thereafter, shaft 21 begins to turn pin 13, and lever 15 pivots up to unfold flap pair 4, 5. The delay period is metered by device 20 and determines the width of the slit between edges 10 and 11. The flap pair 2, 3, is completely folded after edge 11 has cleared the upper edge of window 1 and shortly thereafter edge 10 re-engages the edge 11 which terminates the exposure period. This terminal position is shown in FIG. 2.

Figure 2:
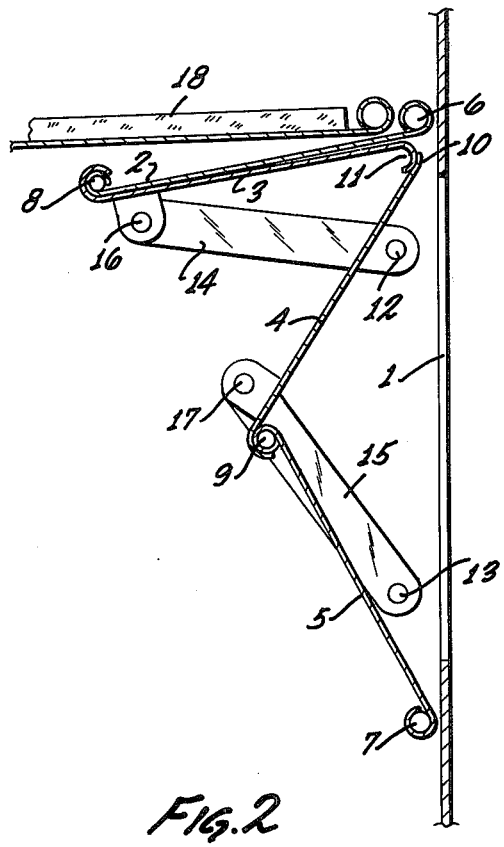
FIG. 2 is a similar side view of the same shutter following release.

The flaps retain the position of FIG. 2 until the shutter is cocked again whereby shaft 21 and 22 reverse and move flaps back into the position shown in FIG. 1. However, the control levers 14, 15 pivot in opposite direction, counter-clockwise in FIG. 2, and in strict unison right from the beginning so that edges 10 and 11 remain engaged in lighttight fashion. Subsequently mirror 18 is folded back to the view finding position.

For time exposure (B settings) the upper flap pair 2, 3, is folded up completely while the lower flap pair 4, 5 remains folded. The latter pair is unfolded after the desired delay has been metered either automatically or manually by the user. The closing position is again as shown in FIG. 2.

It can readily be seen that the shutter operating mechanism is very simple and, therefore, inherently more reliable than in known shutter devices. Also, the control operation, i.e. the linkage between shutter drive 20 and the flaps is quite simply constructed so that rather accurately reproducible and constant operating speeds can be obtained to move edges 10 and 11 exactly as desired by the exposure speed setting. The location of the drive 20 in the camera determines the structure of the linkage between the flap actuating levers 14 and 15, on the one hand, and the outputs or the like of drive 20 on the other hand. Crank-like mechanisms or cam drives can be used here if desired or necessary.

The cocked shutter is not in any manner in the way of mirror 18 when folded down, and since the latter should be folded up completely prior to actual shutter operation, the folding operations of the latter when changed from the position of FIG. 1 to the position of FIG. 2 is not impeded by the mirror. As soon as the mirror 18 is in up position, the space between the lens window is empty and can, therefore, readily be occupied by the moving shutter parts.

The invention is not limited to the embodiments described above but all changes and modifications thereof not constituting departures from the spirit and scope of the invention are intended to be included.

I claim:

1. In a photographic camera, a focal plane shutter being disposed in front of an image aperture in the camera adjacent to the film to be exposed, comprising:
    two pluralities of flaps, the flaps of each of the plurality being hinged to each other, one flap of each plurality of flaps being hinged adjacent to an edge of the aperture so that the two pluralities of flaps are hinged to opposite edges of the aperture, a respective second flap of each plurality of flaps having a free edge, the two free edges extending parallel to each other; and
    means for moving said second flap of each of said plurality of flaps so that said free edges run along, colinearly and parallel to the image aperture.

2. Shutter in claim 1 wherein said means include a pair of levers connected respectively to said second flaps.

3. Shutter as in claim 2 wherein said levers each are mounted for pivoting and the respective pivoting ends are pivotally linked to the second flaps, close to the respective hinge axes of the second flaps.

4. Shutter as in claim 2 wherein said levers turn independently from each other to define a slit between said flap edges.

5. Shutter as in claim 1, said aperture edges are respectively top and bottom edges of the aperture, the aperture being rectangular.

6. Shutter as in claim 1, the camera being of the single reflex type and having a fold up mirror, the flaps as hinged moving in space occupied by the fold up mirror prior to exposure.

* * * * *